United States Patent [19]

Boudewijns et al.

[11] 3,794,763

[45] Feb. 26, 1974

[54] SPEECH-CONTROLLED SWITCHING ARRANGEMENT

[75] Inventors: Henricus Petrus Johannes Boudewijns; Johannes Anton Greefkes, both of Emmasingel, Eindhoven, Netherlands

[73] Assignee: U.S. Philips Corporation, New York, N.Y.

[22] Filed: July 10, 1972

[21] Appl. No.: 270,151

[30] Foreign Application Priority Data

July 15, 1971 Netherlands ...................... 7109806

[52] U.S. Cl. ............................ 179/1 VC, 179/1 HF

[51] Int. Cl. ............................................ H04m 1/00

[58] Field of Search... 179/1 VC, 1 CN, 1 HF, 1 SA

[56] References Cited

UNITED STATES PATENTS

| | | | |
|---|---|---|---|
| 3,674,936 | 7/1972 | Wolfe | 179/1 CN |
| 3,712,959 | 1/1973 | Fariello | 179/1 VC |
| 3,530,247 | 9/1970 | Huber | 179/1 CN |
| 3,524,929 | 8/1970 | Burns et al. | 179/1 CN |

*Primary Examiner*—Kathleen H. Claffy
*Assistant Examiner*—Douglas W. Olms
*Attorney, Agent, or Firm*—Frank R. Trifari

[57] ABSTRACT

A speech-controlled switching arrangement for communication systems in which the speech signals are transmitted in the form of digital signals obtained by code modulation, comprising a plurality of pulse group analyzers coupled to respective transmission channels from which analyzers the output pulses are applied to a comparator circuit after integration for the purpose of generating a switching control signal, while each pulse group analyzer is provided with a digitally defined threshold characterizing a given fixed modulation index.

9 Claims, 3 Drawing Figures

SPEECH-CONTROLLED SWITCHING ARRANGEMENT

Figure 1:
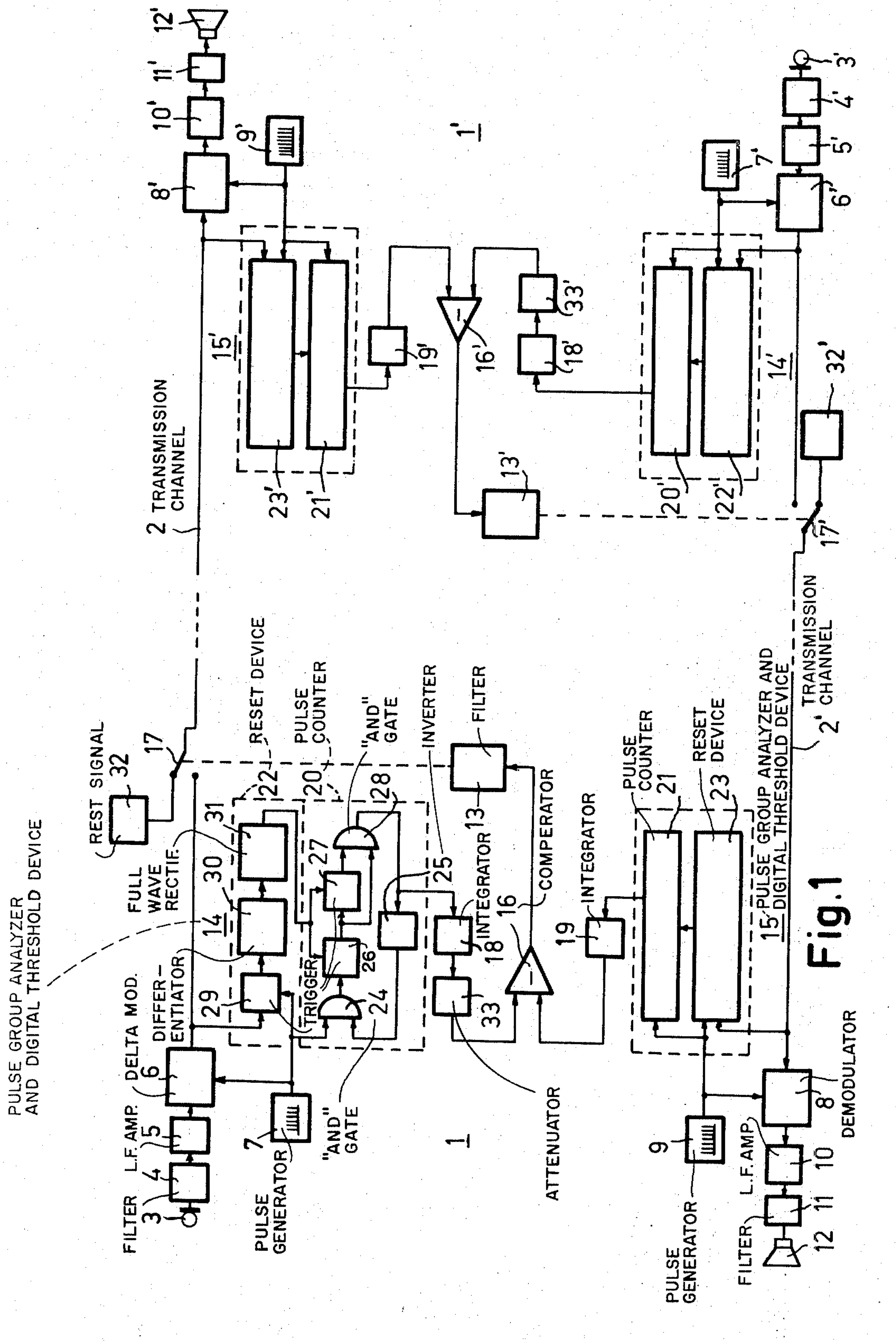

The invention relates to a speech-controlled switching arrangement for communication systems in which the speech signals are transmitted by means of digital signals formed by code modulation, which switching arrangement comprises a number of measuring circuits coupled to respective transmission channels and responsive to the digital signals applied thereto, to produce an output voltage varying as a function of the level of the speech signal at the input of the relevant transmission channel, and a comparator circuit connected to the outputs of the said measuring circuits, to produce a control signal for controlling one or more switches forming part of the switching arrangement.

Such switching arrangements in which the switching decisions are made on the basis of digital signals applied to measuring circuits are known for communication systems employing delta modulation and, as compared with the speech controlled switching arrangements entirely operating with analoge signals, they have the important advantage that the own time constants of the switching arrangements may be very short so that greater freedom is obtained in the correct and accurate adjustment of the time constants required for the satisfactory operation of the communication system as a whole. Despite the above-mentioned advantage, the known systems equipped with digital switching arrangements do not quite come up to expectations. Accurate measurements have shown that the measuring circuits used in these known switching arrangements are very sensitive to supply voltage variations, temperature influences and the like, so that decision errors may occur particularly in case of speech signals of low level. In addition these known speech-controlled switching arrangements are not applicable in compander-equipped code modulation systems.

An object of the invention is to provide a speech-controlled switching arrangement of the kind described in the preamble in which said advantages are maintained and the occurrence of decision errors, even for speech signals of slight level, is substantially obviated, and which in addition is very suitable for use in compander-equipped code modulation systems.

According to the invention the said measuring circuits in such a speech-controlled switching arrangement are each formed by a pulse group analyser which is provided with a digitally defined threshold characterizing a given fixed modulation index, said pulse group analyzer being arranged to successively analyse the composition of the digital signals applied thereto within a fixed and limited time interval and to generate a pulsatory output voltage when a pulse pattern occurs which is representative of a modulation index exceeding the modulation index characterized by said threshold, said pulsatory output voltage after integration in an integrating network connected to the output of the pulse group analyser providing an output voltage which increases as the modulation index increases and which is applied to the comparator circuit.

Figure 2:
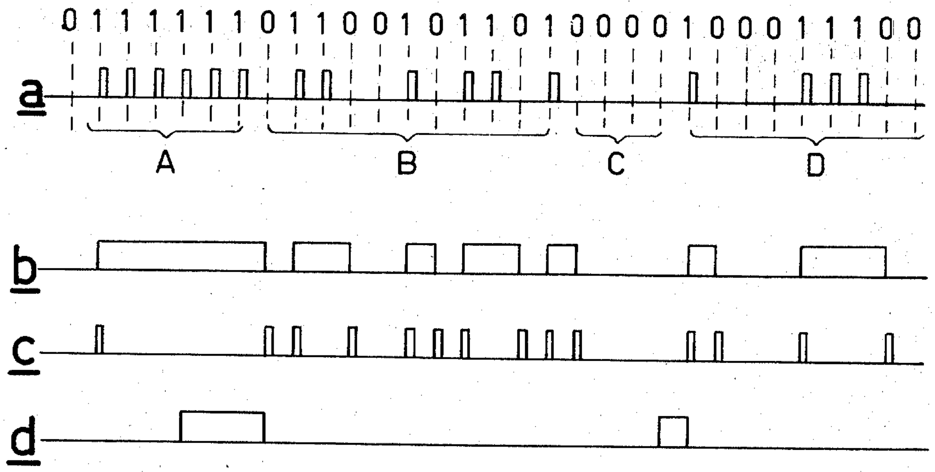
Figure 3:
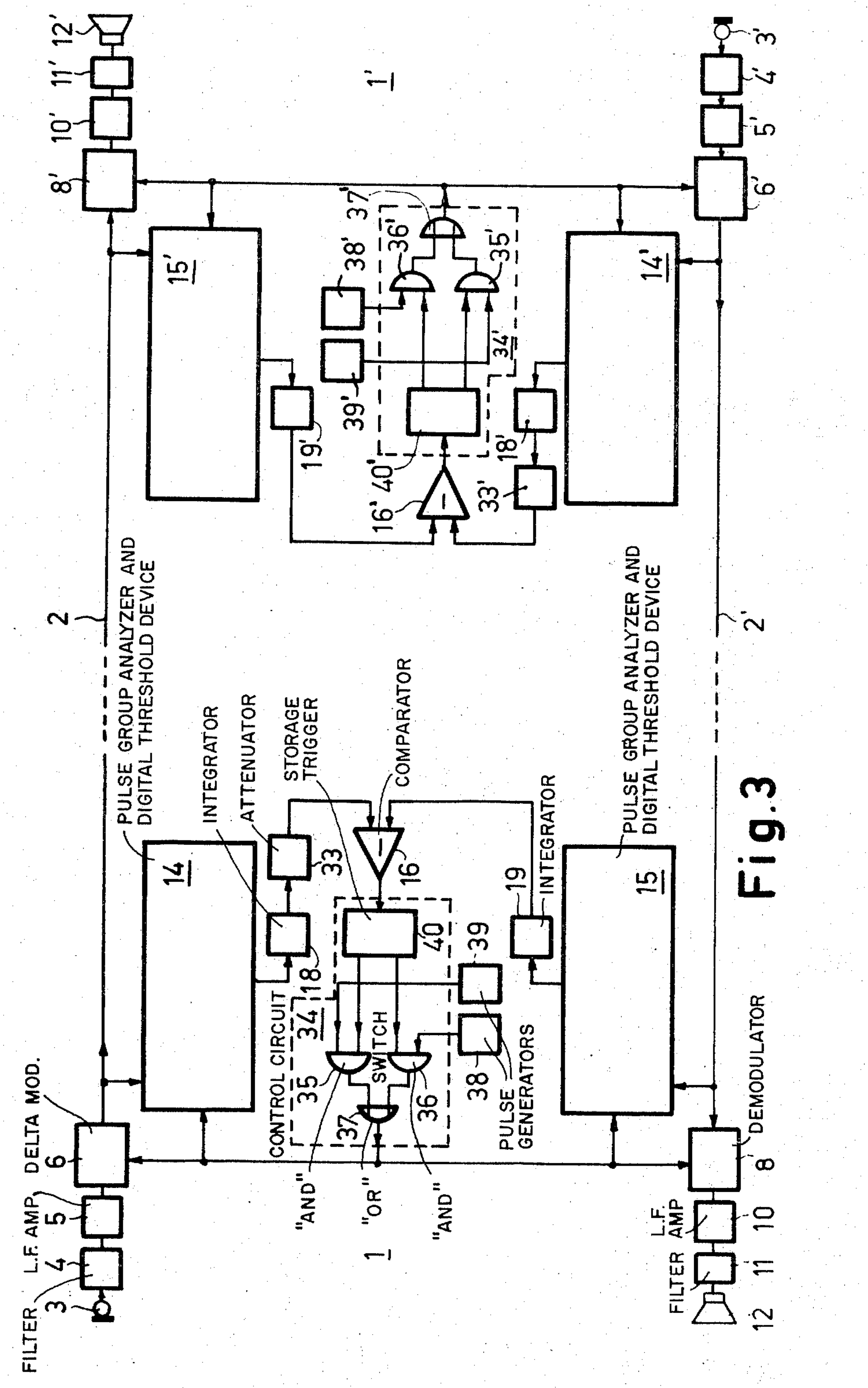

The invention and its advantages will now be described in detail with reference to the figures in which FIG. 1 shows a possible embodiment of the speech-controlled switching arrangement according to the invention, used in a loudspeaking telephony connection, FIG. 2 shows a number of diagrams to explain the operation of the pulse group analysers used in the switching arrangement according to the invention, and FIG. 3 shows a further possible embodiment of the switching arrangement according to the invention likewise used in a loudspeaking telephony connection.

Referring to FIG. 1, there is shown a loudspeaking telephony connection in which two telephony stations 1 and 1′ are located at a distance from each other and which are inter-connected through separate transmission channels 2, 2′. The telephony stations are equipped for the transmission of speech signals in the form of digital signals obtained by pulse code modulation. More particularly the speech signals derived from microphones 3, 3′ are applied to delta modulators 6, 6′ in each of the stations 1, 1′ through speech filters 4, 4′ having a passband of 0 – 3.4 kHz and low-frequency amplifier 5, 5′. The delta modulators are controlled in the rhythm of pulse generators 7, 7′ supplying equidistant pulses and produce code pulses in known manner which in essence characterize a signal value primarily dependent on the slope of the speech signal to be transmitted. The digital signal thus occurring at the output of delta modulators 6, 6′ is applied through transmission channels 2, 2′ to cooperating demodulators 8′, 8 at the opposite station which is controlled by the output pulses from a local pulse generator 9′, 9 to be synchronized with the pulse generator of the transmitting station. Demodulators 8′, 8 operate in known manner to produce the original speech signals which are applied to loudspeakers 12′, 12 through low-frequency amplifiers 10′, 10 and lowpass filters 11′, 11 suppressing the frequencies located above the desired speech frequency band. In the loudspeaking telephony connection described there is a relatively strong acoustic coupling between the loudspeaker and microphone present at one and the same station and in order to prevent acoustically the received speech signals from being fed back in the return connection a speech-controlled switching arrangement is used. This switching arrangement comprises two measuring circuits 14, 15′ and 14′, 15 coupled to one of the transmission channels 2, 2′, respectively, and comparator circuits 16, 16′ coupled to the outputs of these measuring circuits, as well as switches 17, 17′ controlled by the output signal from the comparator circuit.

In the embodiment shown in FIG. 1 these switches 17, 17′ are included in the transmission channels 2, 2′, respectively, and acoustic feedback is prevented in that the release of said transmission channels occurs one at a time and in dependence upon which one of the speech signals occurring at the channel inputs has the higher level. To this end the measuring circuits 14, 15′ and 14′, 15 are to be formed in a manner such that, based on the digital signals applied thereto, they produce output signals which applied to the comparator circuits 16 and 16′ vary as a function of the speech signal level at the input of the relevant channel.

In the known speech-controlled switching arrangements utilizing measuring circuits which are responsive to digital signals, the measuring criterion employed for determinating the level of the speech signal is based on the number of transitions occurring per unit of time and varying as a function of the level between the two binary signal states as they occur in the digital signal applied to the measuring circuit. The channel is released on the basis of the smallest mean number of transitions occurring per unit of time and is decided by the polarity of the difference between the analoge output voltages of the measuring circuits which is found in the comparator.

It has been found that for this manner of controlling the release of the channel, particularly for speech signals of low level, erroneous decisions occur easily. Accurate investigations have shown that these arbitrarily occurring erroneous decisions result from the fact that the output voltages of the measuring circuits for speech signals of low level are close to the maximum value. In fact, the decision in that case is greatly influenced by the tolerances of the components used in the measuring circuits, because the decisive polarity of the difference between two voltages which are both in the vicinity of their maximum value is very sensitive to the precision with which these voltages were derived.

In addition, this manner of controlling the release of the channel has the limitation that it cannot be used in delta modulation systems which are equipped with a compander because this renders the output signals of the measuring circuit indefinite, for in compander equipped delta modulation systems there is no unambiguous relationship between the number of transitions in the digital signal and the slope of the speech signal to be transmitted.

According to the invention the above-mentioned drawbacks may be obviated, if each of the measuring circuits backs may be obviated, if each of the measuring circuits 14, 14' and 15, 15' is formed by a pulse group analyser having a digitally defined threshold characterizing a given fixed modulation index, said pulse group analyser being arranged to successively analyse the composition of the digital signals applied thereto within a fixed and limited time interval and which, upon the occurrence of a pulse pattern which is representative of the modulation index exceeding the modulation index characterized by said threshold, generates a pulsatory output voltage which after integration in integrating networks 18, 18' and 19, 19' connected to the output of the pulse group analyser supplies an output voltage which increases as the modulation index increases and which is applied to the comparator circuits 16, 16'.

A switching arrangement formed in this manner according to the invention is not only suitable for use in transmission systems employing delta modulation and being equipped with dynamic compression and expansion devices, but the use of compansion for the accurate operation of the switching arrangement is even of special advantage.

Thus, the said digitally defined threshold can be chosen at a sufficiently high compression degree such that the threshold value is at half the maximum value of the input signal so that the level detection can be realized in a simple manner with great accuracy.

In addition, when transmitting compressed signals the interference sensitivity and the influence of attenuation in the transmission path is small so that the digital signals applied to the measuring circuits are substantially the same at the transmitter and receiver ends, which contributes to the satisfactory operation of the switch control due to the greater stability obtained.

Dynamic compression and expansion may be realized in different manners. For example, a dynamic control signal may be generated for this purpose in known manner, or the delta modulators 6, 6' and the associated demodulators 8, 8' may be formed in known manner as in FIG. 1 in the form of non-linear coders and decoders having a high degree of compression and expansion (piece-wise linear coder and decoder).

In the said succession of fixed time intervals which, as compared with one period of the speech signals to be transmitted, may be very short and may be approximately 10 percent of one period of the most important speech frequencies at a pulse frequency of 40 kHz, the occurrence or non-occurrence of a pulse group which is representative of a modulation index exceeding the modulation index characterized by said threshold is analysed every time by the pulse group analyser during such a time interval.

The measuring circuit 14, 15' and 14' 15 constituted by the pulse group analysers each comprise a digital threshold device in the form of pulse counters 20, 20', 21', 21 and associated reset devices 22, 22', 23', 23, respectively. The pulse counters 20, 20', 21', 21 are connected to pulse generators 7, 7', 9', 9 respectively, and each have a maximum counting position which is decisive of said fixed threshold characterizing a given modulation index. In the embodiment shown the maximum counting position is $n = 4$. The reset devices 21, 21' and 22', 22 are controlled by the output pulses from delta modulators 6 and 6', respectively, and each cause the associated pulse counters to be reset to their initial position whenever a change occurs in the succession of 0 pulses or in the succession of 1 pulses.

Since the pulse counters and reset devices of the measuring circuits 14, 15', and 15, 14' constituted as pulse group analysers are all built up in the same manner, a further description of the measuring circuit 14 which is shown in greater detail in the figure may be sufficient for the description of this structure.

The pulse counter 20 present therein is constituted by the cascade arrangement of a selection gate in the form of and AND-gate 24 to whose inputs the output pulses from pulse generator 7 and the output pulses from the pulse counter are applied through an inverter 25, a bistabile trigger 26 constituted as a two-to-one divider, a bistable trigger 27 constituted as a two-to-one divider and a selection gate in the form of an AND-gate 28 whose inputs the input and output voltages of the bistable trigger 27 are applied and whose output constitutes the output of the pulse counter which is connected at one end through the inverter 25 to the input of said AND-gate 24 and at the other end to said integrator 18 whose output is coupled to an input of the comparator circuit 16, 16'.

The reset device 22 consists of a bistable trigger 29 controlled by pulses from pulse generator 7 and the 1 and 0 pulses at the output of the delta modulator 6, and a differantiating network 30 and a full wave rectifier 31. The trigger occupies one balanced position upon the occurrence of 1 pulses and occupies the other balanced position upon the occurrence of 0 pulses. Whenever there is a perturbation of the succession of 1 pulses or 0 pulses at the output of delta modulator 6 the bistable trigger 29 changes to its other balanced state and a pulse of alternately positive and negative polarity is obtained by differentiation in the differentiating network 30. These pulses are applied after conversion in the full-wave rectifier 31 into pulses of one and the same polarity as reset pulses to the two bistable triggers 26 and 27 of the pulse counter 20. To explain the operation of the pulse group analyser 14, FIG. 2 shows a few time diagrams. FIG. 2*a* shows a pulse series composed of 1 and 0 pulses as it occurs at the output of the delta modulator 6 and at the input of the bistable trigger 29 of said reset device 22.

When the output voltage of the bistable trigger 29 assumes the value 1 or 0 in accordance with its two balanced states occurring when applying a 1 or a 0 pulse, a voltage of the shape shown in FIG. 2*b* will occur at the output of the bistable trigger 29 as a result of the pulse series illustrated in FIG. 2*a*. By differentiation in the differentiating network 30 of the pulse series shown in FIG. 2*b* and after conversion in the full-wave rectifier 31 the pulse series of positive pulses shown in FIG. 2*c* is subsequently obtained. Whenever there is a perturbation of the succession of a series of 1 pulses or 0 pulses of the pulse series of FIG. 2*a* a reset pulse is generated in this manner which resets the pulse counter 20 to its initial state.

In order to explain the operation of the pulse counter 20 upon the occurrence of the pulse series shown in FIG. 2*a* this pulse series is subdivided into a plurality of pulse groups A, B, C and D. As FIG. 2*c* shows, the reset device 22 provides a reset pulse upon the first pulse of the pulse group A consisting of six successive 1 pulses so that the pulse counter 20 is reset to its initial state, i.e., state 1. In this state the bistable triggers 26 and 27 and AND-gate 28 have an output voltage 0 while a voltage 1 is applied to the input of the AND-gate 24 through the inverter 25.

At the second pulse of pulse group A the corresponding pulse from pulse generator 7 is passed by the AND-gate 24 and consequently the bistable trigger 26 is brought to its other stable state. At the state 2 of the pulse counter 20 now achieved the output voltages of the bistable triggers 26, 27, the AND-gate 28 and the inverter 25 have the values 1, 0, 0, 1 respectively.

At the third pulse of pulse group A the corresponding pulse from pulse generator 7 is passed by the AND-gate 24 and bistable trigger 26 consequently returns to its original stable state while also the bistable trigger 27 is brought to its other stable state. At the position 3 of pulse counter 20 now achieved the output voltages of the bistable triggers 26, 27 AND-gate 28 and inverter 25 have the values 0, 1, 0, 1, respectively.

At the fourth pulse of pulse group A at which state 4, i.e. the final state of the pulse counter 20 is achieved, the relevant pulse from pulse generator 7 passes the AND-gate 24 and bistable trigger 26 is brought to its other stable stage again so that AND-gate 28 provides a voltage 1 because the input and output voltages of bistable trigger 27 are both 1. In this final state of the pulse counter 20 the output voltages of the bistable triggers 26, 27, AND-gate 28 and inverter 25 have the values 1,1,1,0, respectively. The AND-gate 24 is then blocked for pulses from pulse generator 7 because a voltage 0 is applied to the input of AND-gate 24 through inverter 25. At the fifth pulse of pulse group A the AND-gate 24 thus does not pass a pulse and the pulse counter 20 remains in its final position while the AND-gate 28 continues to apply an output voltage to the integrating network 18. The same applies for the sixth pulse of the pulse group A until the pulse counter 20 is reset to its initial state through the reset device 22 upon the occurrence of the first pulse from the subsequent pulse group B which is constituted by a 0 pulse.

In pulse group A consisting of 1 pulses and being composed of three pulse groups of four successive 1 pulses reckoned from the first, second and third pulse from pulse group A, pulse group analyser 14 provides a pulse having a duration which is equal to three times the period of the pulses from pulse generator 7.

Only when a pulse pattern occurs in which at least four equal pulse elements occur successively in the said threshold characterizing a given modulation index exceeded and the pulse counter 20 can reach its final state and provide an output pulse because for each modulation index which is smaller than said threshold characterizing a given modulation index the pulse counter 20 is reset by a reset pulse from reset device 22 to its initial state already before reaching the final state. Thus for the pulse group B there is no succession of four 1 or 0 pulses and accordingly pulse group analyser 14 will not supply an output pulse.

During the subsequent pulse group C four successive 0 pulses occur while the pulse group analyser 14 generates a positive output pulse in the manner as already described with reference to pulse group A.

At the first 1 pulse of the next pulse group D the pulse counter 20 is again returned to its initial state by a reset pulse from reset device 22 and the pulse group analyser provides an output pulse having a duration which is equal to one period of the pulses from pulse generator 7. During pulse group D pulse group analyser 14 does not provide any further output pulse.

In this manner the pulse group analyser generates the pulses shown in FIG. 2*d* as a result of the pulse series of FIG. 2*a* which pulses have a constant amplitude value as is shown in the figure and which are equal in duration to an integral number of times the period of the pulses from the pulse generator connected to the pulse group analyser. Particularly the duration of the output pulse from pulse group analyser 14 for pulse group A in FIG. 2*a* is equal to three times the pulse period of the pulses from pulse generator 7, and for pulse group C it is equal to once the pulse period of the pulses from pulse generator 7. An output voltage which increases as the modulation index increases is obtained from the output pulses shown in FIG. 2*d* from pulse group analyser 14 by means of integration in the integrating network 18. In a corresponding manner each of the pulse group analysers 15′, 14′ and 15 can also supply output pulses from which likewise an output voltage increasing with increasing modulation index is obtained by integration in the integrating networks 19′, 18′ and 19, respectively, connected to these pulse group analysers.

A difference signal which is used as a control signal or the switches 17 and 17′ through smoothing filters 13 and 13′ is produced from the output voltages thus obtained of the integrating networks 18 and 19 and 18′ and 19′ by comparing these output voltages in the comparator circuits 16 and 16′, respectively. These switches 17 and 17′ are shown in the rest position in FIG. 1 in which the output signal from the integrating networks 19′ and 19 is equal to a very small value because the input of demodulators 8′ and 8 is then connected through the switches 17 and 17′ in the rest condition to reset signal sources 32 and 32′ and the connection between transmitter and receiver ends is interrupted in both directions.

The voltage difference between the output voltages of the integrating networks 18 and 19 determines the position of switch 17. As soon as the output voltage of integrating network 18 becomes higher than the output voltage of integrating network 19, the control signal occurring at the output of comparator circuit 16 changes its polarity and consequently switch 17 is brought to the position not shown. The output voltage of integrating network 19' is then likewise larger than the output voltage of integrating network 18' and consequently the control signal occurring at the output of comparator circuit 16' does not change its polarity and switch 17' remains in the rest position shown. The connection between microphone 3 and loudspeaker 12' is released in this case while the connection between microphone 3' and loudspeaker 12 remains interrupted. This condition is interrupted when the output voltage of integrating network 18' becomes higher than the output voltage of integrating network 19' because the control signal occurring at the output of comparator circuit 16' changes its polarity and switch 17' is consequently brought to the position not shown. Since the output voltage of integrating network 19 becomes equal to the output voltage of integrating voltage 18' as a result of the release thus effected of channel 2', the output voltage of integrating network 19 will also be higher than the output voltage of integrating network 18 and the control signal occurring at the output of comparator circuit 16 will then change its polarity so that the switch 17 is brought to the position shown at which channel 2 is interrupted.

When using the speech-controlled switching arrangements described with reference to the embodiment of FIG. 1 it is achieved on the one hand that the channel release decision which is made on the comparator circuits on the basis of the output voltages of the measuring circuits formed as pulse group analysers is practically independent of the tolerances which occur in the elements of these measuring circuits so that decision errors even for speech signals of low level are completely prevented, and on the other hand these switching arrangements are well suited for solid-state integration as a result of the digital construction of the pulse group analysers and as a result of their great independence of the tolerances of the elements used.

In the embodiment of FIG. 1 described so far the only condition which is to be satisfied in order to prevent the tendency of acoustic feedback with certainty is that the overall amplification which occurs between the output of the demodulator and the input of the delta demodulator of one and the same telephony station is smaller than 1.

In addition to the special advantages already mentioned the use of the speech-controlled switching arrangement according to the invention has the additional advantage that the said admissible overall amplification may be chosen to be larger than 1, if desired. As shown in FIG. 1 attenuators 33, 33' may be introduced between the outputs of the integrating networks 18, 18' and the inputs of the comparator circuits 16, 16'. The condition at which the tendency of acoustic feedback is prevented, for the case where $\beta > 1$, is that $1/\beta$ times the output voltage of the integrating networks 18, 18' must be smaller than the output voltage of the integrating networks 19, 19', i.e. when $\beta$ is equal to, for example 3, the overall amplification between demodulator output and modulator input of one and the same station must be smaller than 3.

In the embodiment described hereinbefore the switches 17, 17' associated with the speech-controlled switching arrangement are included in the transmission channels 2, 2' and the tendency of acoustic feedback is prevented in that the channel whose input signal has the larger modulation index is released only.

The tendency of acoustic feedback may, however, alternatively be prevented by utilizing the speech controlled switching arrangements to keep the loop gain of the communication system below the given maximum value at which acoustic feedback may occur.

In the embodiment shown in FIG. 3 in a block diagram of a loudspeaking telephony connection, the speech-controlled switching arrangements present therein are used in accordance with the abovementioned principle. In this figure the components corresponding to those in FIG. 1 have the same reference numerals. This embodiment corresponds to a large extent to that of FIG. 1. It likewise includes two transmission channels 2, 2' for the transmission of speech signals by means of code modulation and each of the two speech-controlled switching arrangements is provided with two pulse group analysers 14, 15 and 14', 15' coupled to the transmission channels and with comparator circuits 16, 16' connected to the outputs of these pulse group analysers, while the control signal for controlling the switch associated with the switching arrangement is derived from these comparators. This embodiment is, however, distinguished from that of FIG. 1 in that said switch is not included in one of the transmission channels but in a control circuit 34, 34' connected to the output of the comparator circuit 16, 16' and with the aid of this control circuit the sensitivity degree of the modulators and demodulators 6, 8 and 6', 8' associated with one and the same station 1.1' can be varied by varying the magnitude of the quantisation unit used in these modulators and demodulators. Said control circuit 34, 34' comprises to this end the said switch which is constituted by two AND-gates 35, 36 and 35', 36' whose outputs are connected through OR-gates 37, 37' to inputs of the modulators and demodulators 6, 8 and 6', 8', two pulse generators 38, 39 and 38', 39' connected to said AND-gates, one pulse generator supplying the output pulses at an amplitude which is representative of a quantisation unit $q_m$ and the other pulse generator supplying output pulses at an amplitude which is representative of a quantisation unit $q_m/a$, and a storage element in the form of a bistable trigger 40, 40' connected to the outputs of the comparator circuit 16, 16' which dependent on its stable state determined by the polarity of the control signal either enables the AND-gate 35, 35' or AND-gate 36, 36' so that either the quantisation unit $q_m$ or the quantisation unit $q_m/a$ is decisive of the extent of sensitivity of the modulators and demodulators 6, 8 and 6', 8'. In this embodiment an equal decrease of the sensitivity of the demodulator is brought about at a given increase of the sound volume of the sound volume of the loudspeaker 12, 12' connected to the demodulator 8, 8'. This embodiment has the additional advantage that when a higher loudspeaker volume is desired due to background noise the influence of this background noise upon increasing this sound level is proportionally reduced by the smaller sensitivity of modulator 6, 6'.

As in the foregoing the speech-controlled switching arrangement according to the invention, when used in a system employing companders, is not only independent of the tolerances of the elements used in the pulse group analysers, but has the additional advantage that the digitally defined threshold value may be high and, for example, as in the embodiment shown, can be chosen to be equal in case of sufficient compression to half the maximum value of the input signal so that a very accurate level detection is obtained.

In case of use in a system which operates without dynamic compression and expansion this threshold value has accordingly to be lower; the advantage of the independence of the tolerances of the elements used in the pulse group analysers is not affected.

The speech-controlled switching arrangement according to the invention may also be used in communication systems other than the kind described above. These switching arrangements may advantageously be used in so-called conference systems because the signalizing and control signals to be transmitted in this kind of systems can be transmitted within the band, provided that is is ensured that the amplitudes of these signals remain below the digitally defined threshold value of the pulse group analysers.

Finally it is to be noted that these pulse group analysers are not limited in their construction to the embodiment described with reference to FIGS. 1 and 3. The pulse counter of the pulse group analyser described in these embodiments may be constituted, for example, by a capacitor incorporated in a charge circuit and including a discharge circuit controlled by said reset device, which capacitor is followed by a comparator stage for comparing the capacitor voltage with a constant reference voltage of such fixed value that the reference voltage is exceeded by the capacitor voltage during the period of four successive pulses from the pulse generator and an output voltage occurs which releases a pulse regenerator from said pulse generator.

What is claimed is:

1. A speech-controlled switching arrangement for use in a communication system having a number of transmission channels in which the speech signals are transmitted by digital signals formed by code modulation, said switching arrangement comprising a number of measuring circuits coupled to respective channels and responsive to the digital signals applied thereto, to produce an output voltage varying as a function of the level of the speech signal at the input of the relevant transmission channel, switching means, a comparator circuit connected to the outputs of the said measuring circuits, to produce a control signal for controlling said switching means, each of said measuring circuits including a pulse group analyzer being arranged to successively analyze the composition of the digital signals applied thereto within a fixed and limited time interval and to generate a pulsatory output voltage when a pulse pattern occurs which is representative of a modulation index exceeding the modulation index characterized by said threshold, and an integrating network connected to the output of each pulse group analyzer for integrating said pulsatory output voltage into an output voltage which increases as the modulation index increases and which is applied to the comparator circuit.

2. An arrangement as claimed in claim 1, wherein the digital signals applied to the pulse group analyzers are derived from a transmitter provided with a dynamic compression device.

3. An arrangement as claimed in claim 1, wherein the pulse group analyzer comprises a pulse counter, whose maximum counting position defined said fixed threshold characterizing a given modulation index, and a reset device fed by the pulses to be transmitted, providing reset pulses for the counter.

4. An arrangement as claimed in claim 3, wherein said pulse counter is provided with a first AND-gate connected to a pulse generator and with a second AND-gate at whose output the output pulses from the pulse counter occur, which output is connected through an inverter to the output of the first AND-gate, and bistable triggers operating as two-to-one dividers being provided between the two AND-gates in such a manner that the input and the output of the last bistable trigger are connected to the second AND-gate.

5. An arrangement as claimed in claim 3, wherein said reset device is provided with a bistable trigger controlled by the pulses to be transmitted and by the pulses from the pulse generator, said trigger being brought from one stable state to the other in case of a change in the succession of equal pulses, said trigger being followed by a differentiating network and a full-wave rectifier.

6. An arrangement as claimed in claim 1, wherein said switching means includes at least one switch incorporated in the transmission channel, so as to interrupt said transmission channel when activated.

7. An arrangement as claimed in claim 6, wherein an attenuator is incorporated in one input of the comparator circuit.

8. An arrangement as claimed in claim 1, wherein said switching means, is included in a control circuit connected to the comparator circuit with the aid of which the sensitivity degree of the modulator and demodulator associated with one and the same station can be varied by varying the magnitude of the quantization unit used in said modulator and demodulator.

9. An arrangement as claimed in claim 8, wherein the switching means included in said control circuit is constituted by two AND-gates and by an OR-gate connected to the outputs of said AND-gates and by an OR-gate connected to the outputs of said AND-gates, while said control circuit is furthermore provided with two pulse generators one of which supplies output pulses which are representative of a quantization unit and the other provides output pulses which are representative of another quantization unit, and a storage element in the form of a bistable trigger connected to the output of the comparator circuit, which storage element enables either the one or the other AND-gate dependent on its stable state determined by the polarity of the control signal.

* * * * *